Jan. 24, 1961  L. WIEDMANN ET AL  2,969,134
SOLENOID OPERATED POSITIVE DRIVE CLUTCH
Filed Oct. 26, 1955  2 Sheets-Sheet 1

INVENTORS
LUDWIG WIEDMANN,
PAUL THIELMANN,
BY
ATTORNEYS.

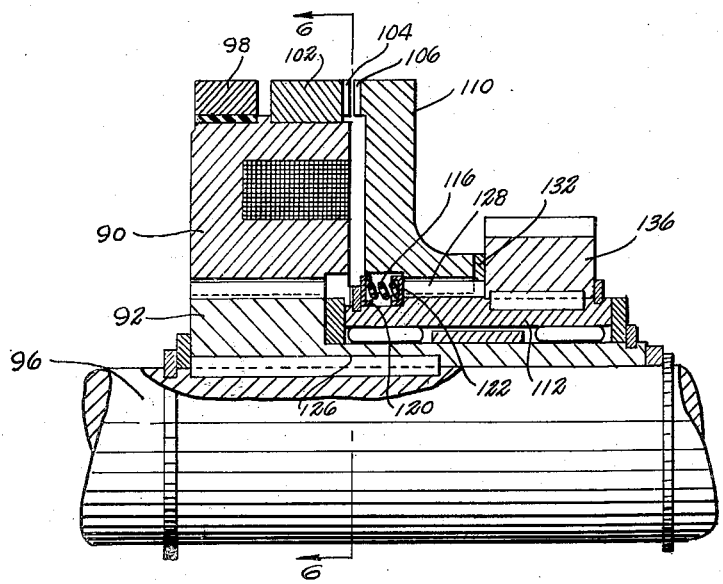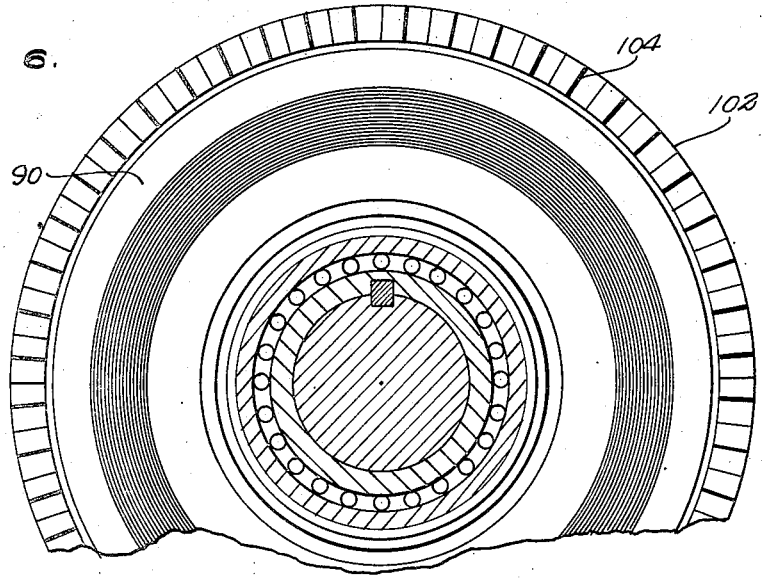

ized Jan. 24, 1961

2,969,134
SOLENOID OPERATED POSITIVE DRIVE CLUTCH

Ludwig Wiedmann, Friedrichshafen, and Paul Thielmann, Friedrichshafen-Spaltenstein, Germany, assignors to I-T-E Circuit Breaker Company, Philadelphia, Pa., a corporation of Pennsylvania Filed Oct. 26, 1955, Ser. No. 542,960

Claims priority, application Germany June 3, 1955

1 Claim. (Cl. 192—84)

This invention relates to solenoid operated clutches and more particularly to clutches having engageable teeth to effect positive drive.

The principal object of the invention is to provide an arrangement where teeth may be intermeshed with each other with a minimum of initial impact under solenoid control. Other objects and features of the invention will be apparent from the description which now follows in conjunction with the appended drawing in which:

Fig. 5 illustrates a further modification of our invention.

Fig. 6 is a section through 6—6 of Fig. 5.

In general, it is difficult to control impact of clutch teeth against each other at the time of engagement. Our invention offers a solution to this problem in that the teeth are provided with slanting surfaces and are engaged in response to a solenoid actuator.

Another feature of the invention consists in applying a type of solenoid actuator which effects a diminishing force thereon so that the sets of driven and driving teeth are brought together under relatively light pressure whereby chattering is minimized.

Figure 1:
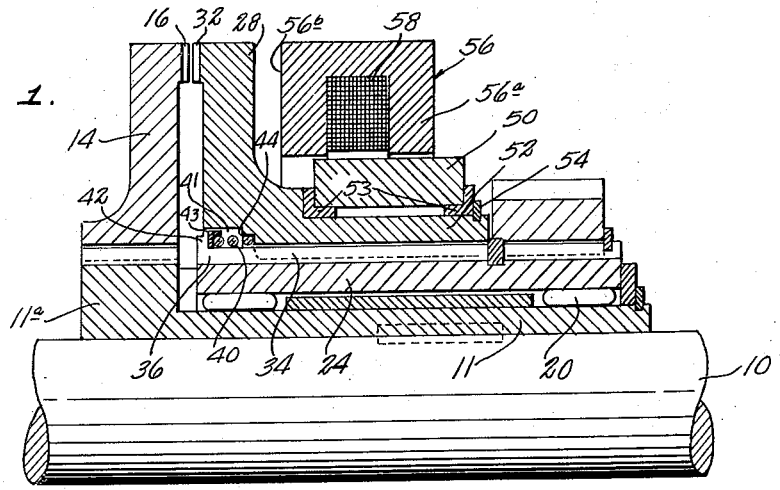
Fig. 1 shows a longitudinal cross-section illustrating the basic components of one form of the invention.

In carrying out the purpose of the invention, as shown in Fig. 1, there is provided a shaft 10 having a sleeve 11 keyed thereto having a flange 11a to which is suitably keyed a driving clutch plate 14 having radial teeth 16. On sleeve 11, carried on bearings 20, is a sleeve 24 comprising a portion of the driven side of the clutch. Carried on sleeve 24 is the driven clutch plate 28 having radial teeth 32. The plate 28 is slidably splined at 34 to sleeve 24. A spring 40 is carried in an annular socket 41 within the plate 28 and abuts a shoulder 42 on sleeve 24 at one end, through a washer 43, and abuts a shoulder 44 within plate 28 at the other end. It will thus be appreciated that the clutch plate 28 is biased toward the right so as to disengage the teeth 16 and 32.

In order to effect engagement of the teeth, a cylindrical armature 50 is carried on an elongated collar 52 extending from plate 28 and will be understood to be firmly fastened to the collar 52 as by spacer plates 53 and a locking ring 54. Thus, the armature 50 is in itself a collar of suitable length surrounding the shaft 10 and fixed with respect to the driven clutch plate 28 and being rotative therewith. An electro-magnetic solenoid body 56 is provided which will be seen to comprise a ring having an internal annular slot in which the coil 58 of the electromagnet is disposed. It will be apparent that the sides 56a and 56b constitute poles of the magnet 56.

It has been found that when the magnet is energized, the armature 50, shown in clutch-disengaged position, will be drawn to the left, first with considerable force and then with a diminishing force as portions of the armature ring extend further into the bore in the circular magnet 56. The effect of this slackening of force is to bring the teeth 32 into relatively light pressure engagement with the teeth 16. Thus, the initial impact is controlled with a minimum of stress effects on the teeth.

Figure 3:
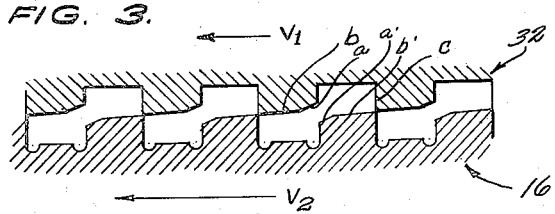
Fig. 3 is a diagrammatic illustration of clutch teeth approaching synchronization and Fig. 4 shows the position of the teeth when meshed or synchronized.

By reference to Fig. 3, the particular shape of the teeth will be noted as having slanted surfaces wherein each tooth of one set has a pair of slanting surfaces a and b and the teeth of the other set have co-acting surfaces a' and b'. Thus, the arrows designated as V1 and V2 show the relative speeds of the two sets of teeth at the point of initial contact. It will be appreciated that due to the complemental slant of the surfaces the teeth will have a tendency to initially glide along each other and overrun and not engage one another so long as there is a certain difference of speeds between the two clutch rings. The relative rotary speeds being of decreasing ratio, the teeth ultimately engage along vertical surfaces c and c' as shown in Fig. 4.

Figure 2:
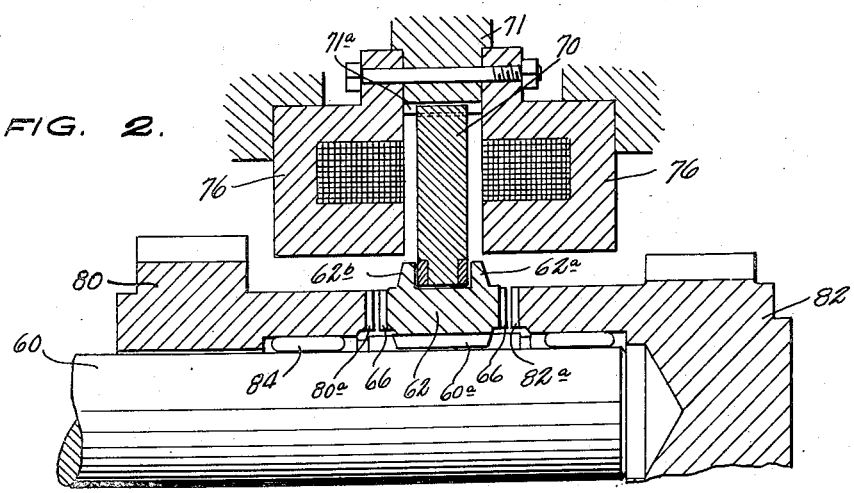
Fig. 2 is a longitudinal cross-section illustrating a second form of the invention.
Figure 4:
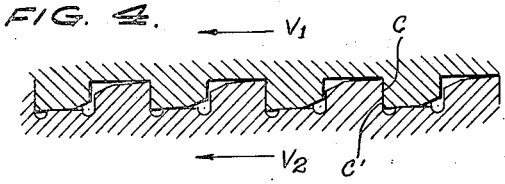

Attention is now invited to Fig. 2 wherein the second form of the invention is illustrated utilizing teeth as disclosed in Figs. 3 and 4. In this instance, a double clutch is disclosed wherein the driving member is alternately and selectively engageable with one or the other of a pair of driven members. Thus, mounted on the shaft 60 is a ring 62 which will be understood to be slidably splined to the shaft at 60a. The ring 62 carries on each side a set of driving teeth 66 and circumferentially surrounding the ring is a disk-like armature 70 retained by flanges 62a and 62b of the ring 62.

In order to actuate the armature 70, a pair of solenoids 76 are disposed in spaced relation on opposite sides of the armature 70, it being understood that the solenoids are suitably retained fixed in space by being bolted to an annular housing element 71 to which the outer periphery of the armature is splined at 71a. Accordingly, energization of either of the solenoids 76 will pull armature 70 toward the energized solenoid, thereby driving either collor 80 or 82 by meshing of the respective sets of teeth 66 with teeth 80a or 82a depending on which solenoid 76 has been energized. The collars 80 and 82 are carried on shaft 60 by means of bearings 84, as shown.

Having thus described the invention, it is apparent that changes may be made without departing from the spirit thereof, and accordingly, it is not desired to limit the invention to the precise illustrations herein given except as set forth in the appended claim. Thus, only one of the sets of teeth need have the slanted frontal surface.

In the form of the invention shown in Fig. 5, a solenoid magnet 90 is keyed to a sleeve 92 which is in turn keyed to a driving shaft 96. The solenoid magnet body is rotative with the shaft and carries a slip-ring 98 which may be insulated from the body. Also carried by the solenoid body and secured thereto is a ring 102 having clutch teeth 104 engageable with the teeth 106 of an armature 110. Armature 110 is slidably keyed to a sleeve 112 having suitable rotative bearing support on sleeve 92. Spring elements such as 116, suitably angularly spaced, are provided for biasing the armature away from the solenoid magnet. Rings, such as 120 and 122, having pockets, may be utilized to take the pressure of the springs. Thus, ring 120 bears against a locking ring 126 while ring 122 may bear against the inner faces of the splines 128 provided in an annular bore of the armature. A spacer ring 132 serves as a limit stop for the armature against the side of a gear 136 keyed to sleeve 112. From the foregoing description it will be apparent that an economy has been effected by virtue of providing clutch teeth directly on the armature.

We claim:

A positive drive clutch, comprising a shaft having a sleeve keyed thereto, a solenoid magnet body keyed to said sleeve, an additional sleeve rotatively carried on said shaft, a disk-like armature carried on said additional sleeve and provided with radially disposed clutch teeth, a clutch-ring carried by said solenoid body and having teeth engageable with the teeth on said armature when said solenoid magnet is energized; each of said teeth of said armature being comprised of relatively straight sides and a top surface joining said relatively straight sides; the sides of the said teeth of said armature facing the direction of motion of said armature being longer than the sides away from the direction of motion whereby each of said top surfaces of said teeth of said armature have a slanted surface; each of said teeth of said clutch ring comprising relatively straight sides and a top surface joining said last mentioned relatively straight sides; the sides of said clutch ring teeth facing the direction of motion of said clutch ring teeth being shorter than the sides away from the direction of motion of said clutch ring teeth whereby said top surfaces of said clutch ring teeth have slanting surfaces relatively parallel to said slanting top surfaces of said teeth of said armature.

References Cited in the file of this patent

UNITED STATES PATENTS

| | | |
|---|---|---|
| 1,515,100 | Foster | Nov. 11, 1924 |
| 1,989,984 | Hope | Feb. 5, 1935 |
| 2,049,126 | Maybach | July 28, 1936 |
| 2,055,723 | Hope | Sept. 29, 1936 |
| 2,667,252 | Meyer | Jan. 26, 1954 |

FOREIGN PATENTS

| | | |
|---|---|---|
| 581,277 | Germany | July 24, 1933 |
| 901,249 | Germany | Jan. 7, 1954 |
| 1,058,426 | France | Nov. 4, 1953 |